(12) United States Patent
Bhattacharya et al.

(10) Patent No.: US 7,500,207 B2
(45) Date of Patent: Mar. 3, 2009

(54) INFLUENCE-BASED CIRCUIT DESIGN

(75) Inventors: Subhrajit Bhattacharya, White Plains, NY (US); Anthony Correale, Jr., Raleigh, NC (US); Nathaniel D. Hieter, Clinton Corners, NY (US); Veena S. Pureswaran, Morrisville, NC (US); Ruchir Puri, Baldwin Place, NY (US)

(73) Assignee: International Business Machines Corporation, Armonk, NY (US)

( * ) Notice: Subject to any disclaimer, the term of this patent is extended or adjusted under 35 U.S.C. 154(b) by 366 days.

(21) Appl. No.: 11/354,425

(22) Filed: Feb. 15, 2006

(65) Prior Publication Data

US 2007/0192752 A1 Aug. 16, 2007

(51) Int. Cl.
*G06F 17/50* (2006.01)
(52) U.S. Cl. .................. 716/4; 716/1; 716/2; 716/3; 716/5; 716/6
(58) Field of Classification Search ............. 716/1–6; 326/41
See application file for complete search history.

(56) References Cited

U.S. PATENT DOCUMENTS

| | | | |
|---|---|---|---|
| 5,619,418 A | 4/1997 | Blaauw et al. | |
| 5,903,577 A * | 5/1999 | Teene | 714/724 |
| 6,668,358 B2 | 12/2003 | Friend et al. | |
| 6,813,750 B2 | 11/2004 | Usami et al. | |
| 7,093,208 B2 * | 8/2006 | Williams et al. | 716/3 |
| 7,137,080 B2 * | 11/2006 | Acar et al. | 716/2 |
| 7,197,733 B2 * | 3/2007 | Issa et al. | 716/6 |
| 7,366,997 B1 * | 4/2008 | Rahmat et al. | 716/1 |
| 2002/0073388 A1 * | 6/2002 | Orshansky et al. | 716/5 |
| 2004/0230924 A1 | 11/2004 | Williams et al. | |
| 2005/0034089 A1 * | 2/2005 | McGuffin et al. | 716/5 |
| 2007/0083832 A1 * | 4/2007 | Orshansky et al. | 716/2 |
| 2007/0164785 A1 * | 7/2007 | He | 326/41 |

OTHER PUBLICATIONS

Golda et al.; "Temperature influence on power consumption and time delay"; Sep. 1-6, 2003; Digital System Design, 2003. Proceedings. Euromicro Symposium on; pp. 378-382.*

(Continued)

*Primary Examiner*—Helen Rossoshek
(74) *Attorney, Agent, or Firm*—Brian Verminski; Hoffman Warnick LLC

(57) ABSTRACT

An improved solution for designing a circuit is provided. A set of target paths, each of which has a performance attribute that is targeted for improvement, is obtained from a design for the circuit. An influence for one or more of the nodes in the set of target paths is obtained. One or more of the nodes are selected for improvement using the influence. Subsequently, the performance attribute for each selected node is improved. For example, an implementation of the node can be replaced with an implementation having an improved performance attribute. The relative improvement provided by an alternative implementation versus a relative detriment to another performance attribute can be obtained and used in selecting the node(s) for improvement. In one embodiment, the relative improvement and influence are used to obtain a sensitivity metric for each alternative implementation, which is used in selecting the node(s) for improvement. In this manner, the circuit can be improved in a more effective manner.

20 Claims, 7 Drawing Sheets

OTHER PUBLICATIONS

Power distribution techniques for dual VDD circuits Sarvesh et asl.; "Power distribution techniques for dual VDD circuits"; Jan. 2006; ASP-DAC '06: Proceedings of the 2006 conference on Asia South Pacific design automation; Publisher: IEEE Press.*

De, Vivek et al., "Technology and Design Challenges for Low Power and High Performance", Invited Paper for ISLPED99, San Diego, CA, 1999, pp. 163-168.

Donath, Wilm et al., "Transformational Placement and Synethesis", Design, Automation and Test in Europe, Mar. 2000, pp. 1-8.

Wei, Liqiong et al., "Power Minimization by Simultaneous Dual-Vth Assignment and Gate-sizing", IEEE 2000 Custom Integrated Circuits Conference, pp. 413-416.

Lee, Dongwoo et al., "Static Leakage Reduction through Simultaneous Threshold Voltage and State Assignment", DAC 2003, Jun. 2-6, 2003, Anaheim, California USA, pp. 191-194.

Nguyen, David et al., "Minimization of Dynamic and Static Power Through Joint Assignment of Threshold Voltages and Sizing Optimization", ISLPED '03, Aug. 25-27, 2003, Seoul, Korea, pp. 158-163.

* cited by examiner

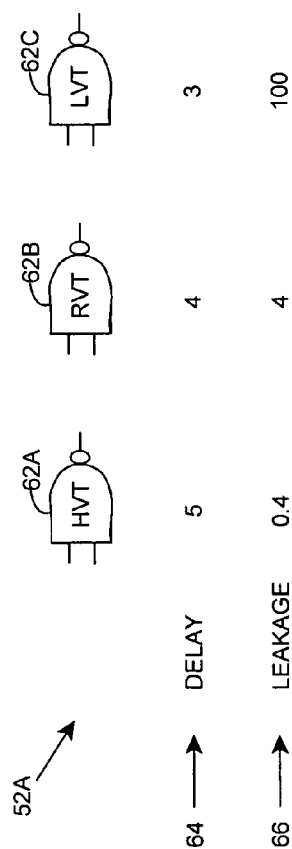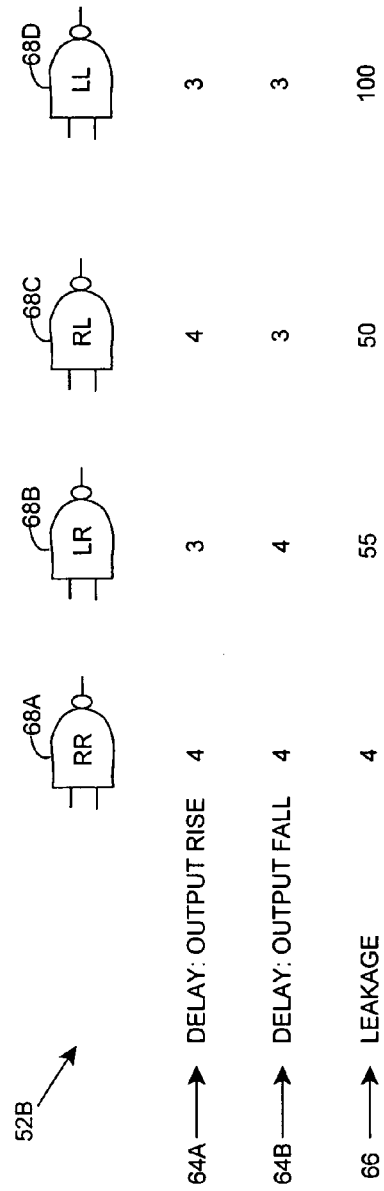

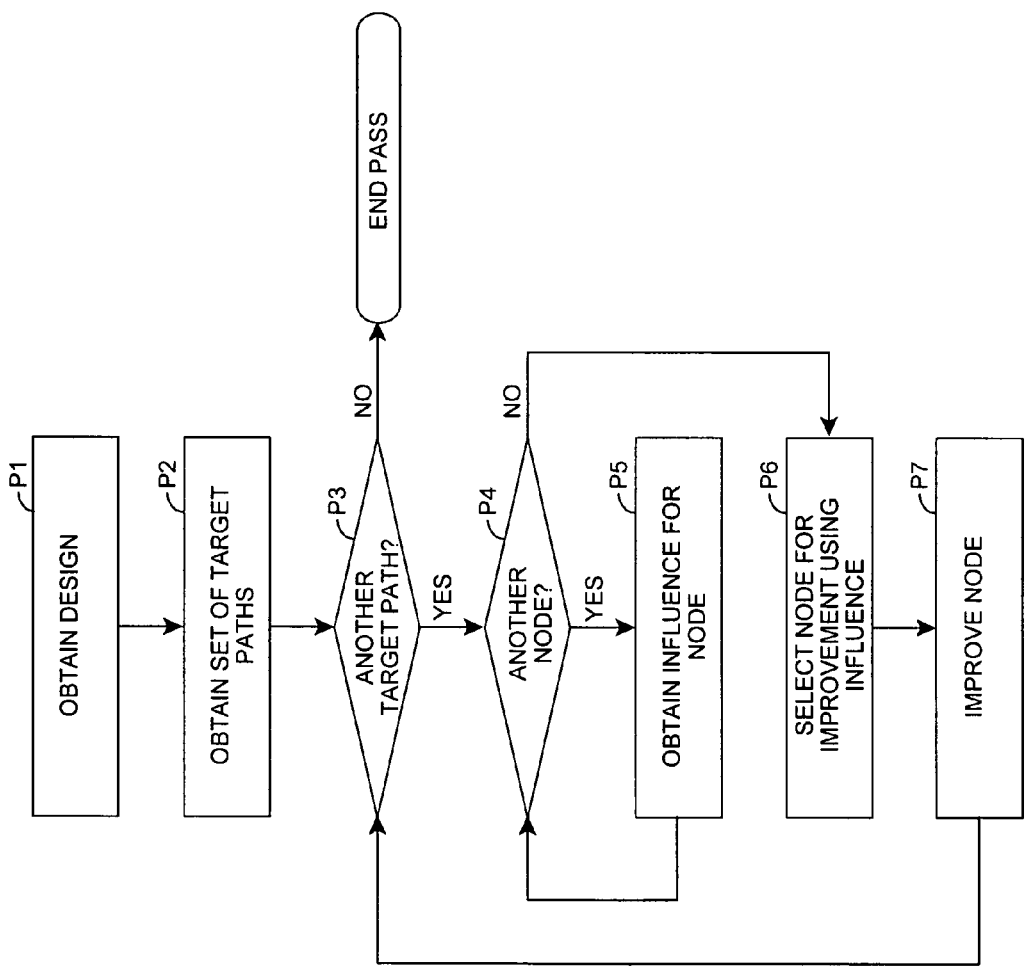

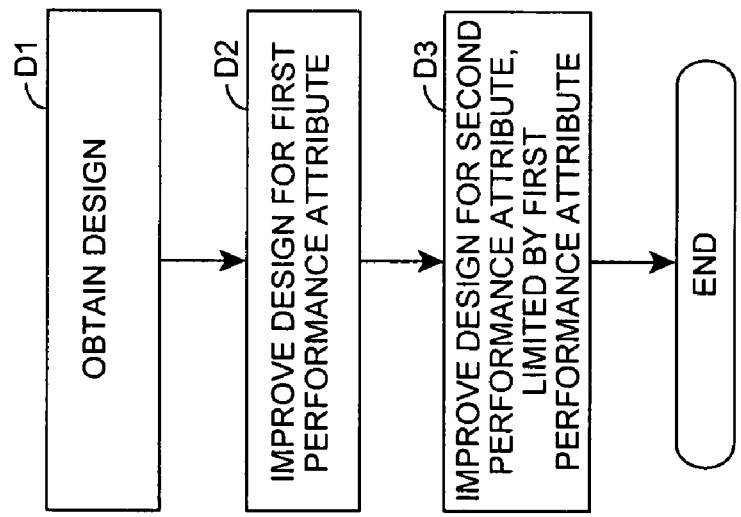

INFLUENCE-BASED CIRCUIT DESIGN

FIELD OF THE INVENTION

The invention relates generally to designing a circuit, and more particularly, to a solution for improving one or more performance attributes of the circuit.

BACKGROUND OF THE INVENTION

In modern chip design, there is an ever present desire to run chips at higher frequencies. Limiting power dissipation is a significant challenge in the design of such circuits. In particular, high power dissipation causes several problems, which include a reduction of the battery life in mobile systems, added cost to packaging, added cost to a cooling solution, and/or the like. Further, power dissipation can cause various circuit problems, and even a chip failure (e.g., due to overheating). Two prominent sources for power dissipation are dynamic power dissipation, which occurs when a device (e.g., transistor, gate, or the like) changes state, and leakage (static) power dissipation, which results when the device allows current to flow through even when it is not switching. As the channel length sizes of transistors used in a circuit are reduced, leakage power dissipation becomes more significant to the overall power consumption of the circuit.

Timing closure is frequently performed as part of designing a circuit. This process involves analyzing each path in the design to determine whether it meets the clock cycle time requirements of the design. If not, the operational speed of one or more components on the path can be improved. The operational speed of a path component can be improved in many ways. A typical approach for improving the speed of a path component involves replacing a higher threshold voltage implementation of the path component with a lower threshold voltage implementation of the component, which operates faster. However, lower threshold voltage implementations leak more power than the higher threshold voltage implementations. As a result, such a replacement generally will increase the amount of leakage in the circuit.

Various solutions exist that seek to perform timing closure while accounting for the amount of leakage. For example, one solution assumes that a larger area is required for a faster implementation of a device. To this extent, the solution uses a measurement derived from a change in the timing and a change in the area between a current implementation and a new implementation. The solution selects the new implementation that provides the best benefit in timing while using the smallest amount of additional area. However, for some implementations, the area versus timing tradeoff does not apply.

To this extent, a need exists for an improved solution for designing a circuit that addresses the problems discussed herein and/or other problems recognizable by one in the art.

BRIEF SUMMARY OF THE INVENTION

The invention provides an improved solution for designing a circuit. A set of target paths, each of which has a performance attribute that is targeted for improvement, is obtained from a design for the circuit. An influence for one or more of the nodes in the set of target paths is obtained. One or more of the nodes are selected for improvement using the influence. Subsequently, the performance attribute for each selected node is improved. For example, an implementation of the node can be replaced with an implementation having an improved performance attribute. The relative improvement provided by an alternative implementation versus a relative detriment to another performance attribute can be obtained and used in selecting the node(s) for improvement. In one embodiment, the relative improvement and influence are used to obtain a sensitivity metric for each alternative implementation, which is used in selecting the node(s) for improvement. In this manner, the circuit can be improved in a more effective manner.

A first aspect of the invention provides a method of designing a circuit, the method comprising: obtaining a design for the circuit; obtaining a set of target paths in the design, each target path comprising a set of nodes and having a first performance attribute that is targeted for improvement; obtaining an influence for at least some of the nodes in the set of target paths, wherein the obtaining includes at least one of: determining a total number of target paths in the set of target paths on which each of the at least some of the nodes is present; or calculating, for each of the at least some of the nodes, a sum of improvements to the first performance attribute obtained for each node targeted for improvement in the set of target paths as a result of an improvement to the first performance attribute for the node; selecting at least one of the at least some of the nodes for improvement using the influence; improving the first performance attribute of the at least one of the at least some of the nodes in the design; and storing the improved design for the circuit.

A second aspect of the invention provides a system for designing a circuit, the system including at least one computing device comprising: a system for obtaining a design for the circuit; a system for obtaining a set of target paths in the design, each target path comprising a set of nodes and having a first performance attribute that is targeted for improvement; a system for obtaining an influence for at least some of the nodes in the set of target paths, wherein the system for obtaining includes a system for determining a total number of target paths in the set of target paths on which each of the at least some of the nodes is present; a system for selecting at least one of the at least some of the nodes for improvement using the influence; and a system for improving the first performance attribute of the selected at least one of the at least some of the nodes.

A third aspect of the invention provides a program product stored on a physical computer-readable medium, which when executed, enables a computer infrastructure to design a circuit, the program product comprising computer program code for enabling the computer infrastructure to: obtain a design for the circuit; obtain a set of target paths in the design, each target path comprising a set of nodes and having a first performance attribute that is targeted for improvement; obtain an influence for at least some of the nodes in the set of target paths, wherein the obtaining includes calculating, for each of the at least some of the nodes, a sum of improvements to the first performance attribute obtained for each node targeted for improvement in the set of target paths as a result of an improvement to the first performance attribute for the node; select at least one of the at least some of the nodes for improvement using the influence; improve the first performance attribute of the at least one of the at least some of the nodes; and store the improved design for the circuit.

A fourth aspect of the invention provides a method of generating a system for designing a circuit, the method comprising: providing a computer infrastructure operable to: obtain a design for the circuit; obtain a set of target paths in the design, each target path comprising a set of nodes and having a first performance attribute that is targeted for improvement; obtain an influence for at least some of the nodes in the set of target paths, wherein the obtaining includes at least one of: determining a total number of target paths in the set of target paths on which each of the at least some of the nodes is present; or calculating, for each of the at least some of the nodes, a sum of improvements to the first performance attribute obtained for each node targeted for improvement in the set of target paths as a result of an improvement to the first performance attribute for the node; select at least one of the at least some of the nodes for improvement using the influence; improve the first performance attribute of the at least one of the at least some of the nodes; and store the improved design for the circuit.

The illustrative aspects of the present invention are designed to solve the problems herein described and other problems not discussed, which are discoverable by one in the art.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention, in which:

FIGS. 4A-B show portions of two illustrative node libraries according to an embodiment of the invention.

FIG. 6 shows another illustrative process for improving design according to an embodiment of the invention.

FIG. 7 shows another illustrative process for improving a design according to an embodiment of the invention.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the invention provides an improved solution for designing a circuit. A set of target paths, each of which has a performance attribute that is targeted for improvement, is obtained from a design for the circuit. An influence for one or more of the nodes in the set of target paths is obtained. One or more of the nodes are selected for improvement using the influence. Subsequently, the performance attribute for each selected node is improved. For example, an implementation of the node can be replaced with an implementation having an improved performance attribute. The relative improvement provided by an alternative implementation versus a relative detriment to another performance attribute can be obtained and used in selecting the node(s) for improvement. In one embodiment, the relative improvement and influence are used to obtain a sensitivity metric for each alternative implementation, which is used in selecting the node(s) for improvement. In this manner, the circuit can be improved in a more effective manner. As used herein, unless otherwise noted, the term "set" means one or more (i.e., at least one).

It is understood that while the invention is described herein with respect to the timing versus leakage circuit design problem/consideration, this is only illustrative of various types of similar problems/considerations that can be addressed when designing a circuit. For example, the invention can be applied to any type of consideration in which the improvement of one performance attribute generally adversely impacts another performance attribute. To this extent, the invention is not limited to this particular application.

Figure 1:
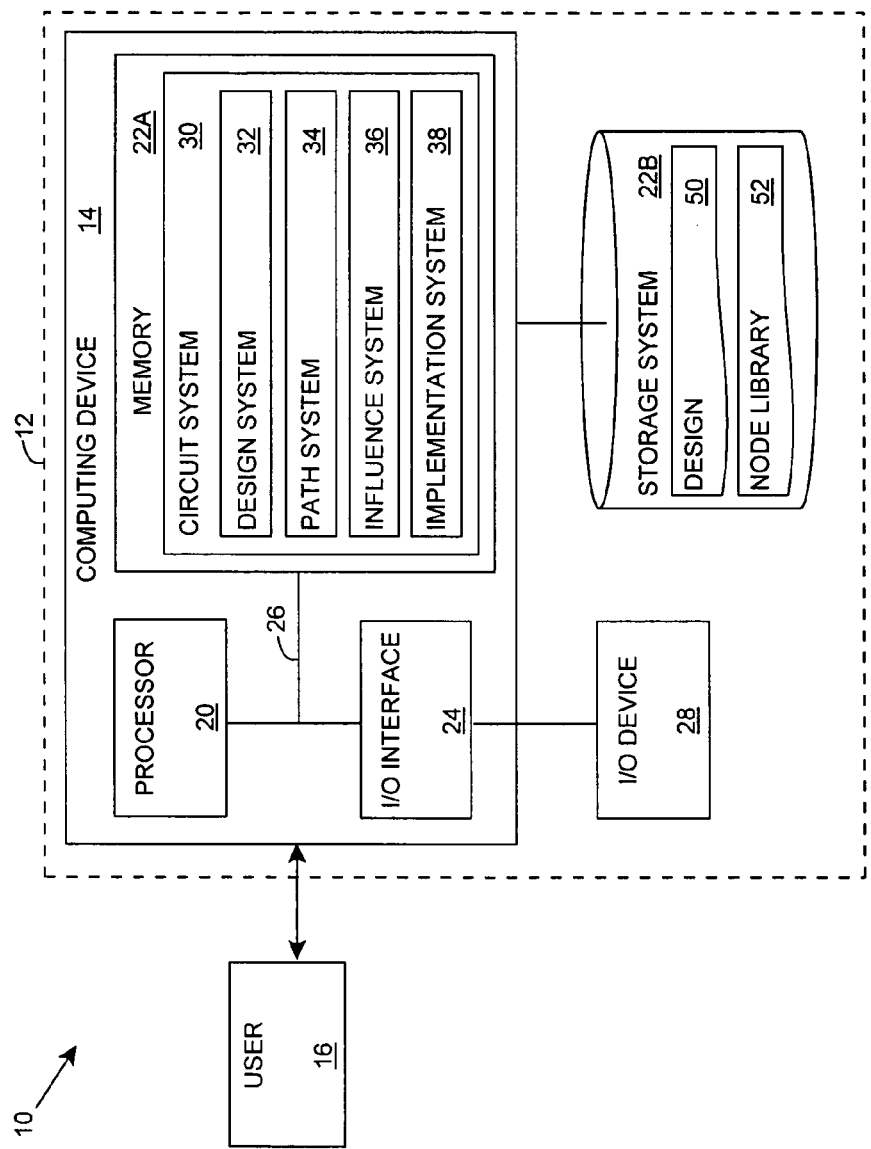
FIG. 1 shows an illustrative environment for designing a circuit according to an embodiment of the invention.

Turning to the drawings, FIG. 1 shows an illustrative environment 10 for designing a circuit according to an embodiment of the invention. To this extent, environment 10 includes a computer infrastructure 12 that can perform the process described herein in order to improve one or more performance attributes of a design 50 for the circuit. In particular, computer infrastructure 12 is shown including a computing device 14 that comprises a circuit system 30, which makes computing device 14 operable to design a circuit by performing the process described herein.

Computing device 14 is shown including a processor 20, a memory 22A, an input/output (I/O) interface 24, and a bus 26. Further, computing device 14 is shown in communication with an external I/O device/resource 28 and a storage system 22B. As is known in the art, in general, processor 20 executes computer program code, such as circuit system 30, which is stored in memory 22A and/or storage system 22B. While executing computer program code, processor 20 can read and/or write data, such as design 50, to/from memory 22A, storage system 22B, and/or I/O interface 24. Bus 26 provides a communications link between each of the components in computing device 14. I/O device 28 can comprise any device that enables an individual to interact with computing device 14 or any device that enables computing device 14 to communicate with one or more other computing devices using any type of communications link.

In any event, computing device 14 can comprise any general purpose computing article of manufacture capable of executing computer program code installed thereon (e.g., a personal computer, server, handheld device, etc.). However, it is understood that computing device 14 and circuit system 30 are only representative of various possible equivalent computing devices that may perform the process described herein. To this extent, in other embodiments, the functionality provided by computing device 14 and circuit system 30 can be implemented by a computing article of manufacture that includes any combination of general and/or specific purpose hardware and/or computer program code. In each embodiment, the program code and hardware can be created using standard programming and engineering techniques, respectively.

Similarly, computer infrastructure 12 is only illustrative of various types of computer infrastructures for implementing the invention. For example, in one embodiment, computer infrastructure 12 comprises two or more computing devices (e.g., a server cluster) that communicate over any type of communications link, such as a network, a shared memory, or the like, to perform the process described herein. Further, while performing the process described herein, one or more computing devices in computer infrastructure 12 can communicate with one or more other computing devices external to computer infrastructure 12 using any type of communications link. In either case, the communications link can comprise any combination of various types of wired and/or wireless links; comprise any combination of one or more types of networks (e.g., the Internet, a wide area network, a local area network, a virtual private network, etc.); and/or utilize any combination of various types of transmission techniques and protocols.

As discussed herein, circuit system 30 enables computer infrastructure 12 to design a circuit. To this extent, circuit system 30 is shown including a design system 32, a path system 34, an influence system 36, and an implementation system 38. Operation of each of these systems is discussed further herein. However, it is understood that some of the various systems shown in FIG. 1 can be implemented independently, combined, and/or stored in memory for one or more separate computing devices that are included in computer infrastructure 12. Further, it is understood that some of the systems and/or functionality may not be implemented, or additional systems and/or functionality may be included as part of computer infrastructure 12.

Regardless, the invention provides a solution for designing a circuit. To this extent, design system 32 can manage a set of designs 50 for various circuits. Each design 50 comprises data that defines some/all of a circuit, such as an integrated circuit. To this extent, each design 50 can comprise a set of nodes and a set of connections between the various nodes. Each node can be defined at any level of detail for circuit, e.g., transistor-level (e.g., PFET, NFET, etc.), gate-level (e.g., AND, OR, NAND, etc.), functional component-level (e.g., switch, sensor, diode, etc.), and/or the like. The connections between the various nodes define paths of the circuit. Each path comprises a unique set of nodes through which a signal travels from a starting point (e.g., an input pin) to an ending point (e.g., a latch or a primary output).

Figure 3A:
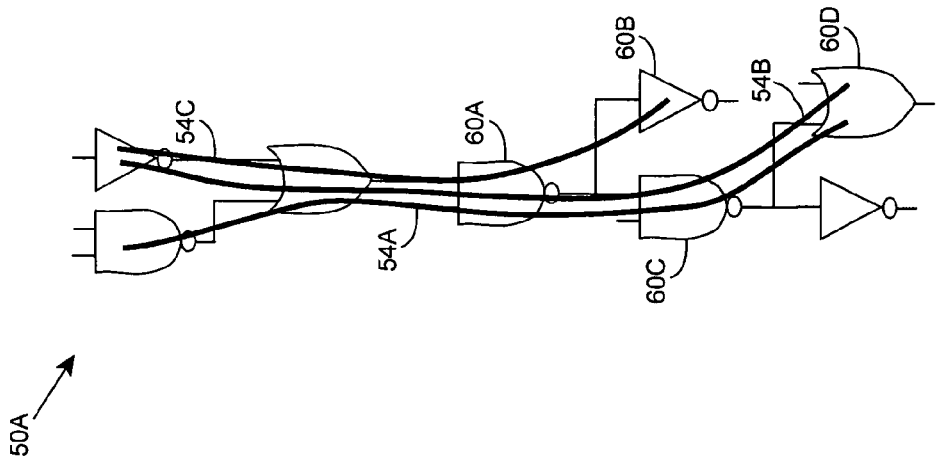
FIGS. 3A-B show a portion of an illustrative gate-level design without and with an illustrative set of target paths, respectively, according to an embodiment of the invention.

For example, FIG. 3A shows a portion of an illustrative gate-level design 50A. Gate-level design 50A includes various nodes, such as nodes 60A-D, and various connections between nodes 60A-D. Each node 60A-D can correspond to a particular type of gate. For example, nodes 60A, 60C each can comprise a NAND gate, node 60B can comprise a NOT gate, and node 60D can comprise an OR gate. It is understood that gate-level design 50A and nodes 60A-D are only illustrative of the various designs 50A that can be processed by the invention.

Returning to FIG. 1, in general, design system 32 can receive and/or send a design 50 to one or more users 16 and/or perform one or more operations (e.g., display, modify, delete, etc.) to design 50 in response to a request from user 16. User 16 can comprise an individual, in which case design system 32 can generate a user interface that, when displayed to user 16, enables user 16 to view/modify design 50. Further, user 16 can comprise another system, in which case, design system 32 can implement an application program interface (API) or the like, that enables user 16 to communicate request(s) for data/operations to design system 32 and receive data on design(s) 50 from design system 32. In any event, design system 32 can store each design 50 using any data storage solution, e.g., as one or more data files, record(s) in a database, and/or the like.

Design system 32 can obtain a design 50, which user 16 desires analyzed for potential improvement(s). To this extent, user 16 could provide (e.g., communicate) design 50 to design system 32, design system 32 can retrieve design 50 from a storage device 22B, and/or the like. Further, user 16 can specify the particular improvement. In one embodiment, the improvement comprises improving one or more performance attributes of one or more of the paths in design 50. For example, the performance attribute can comprise the timing for one or more paths. In this case, design 50 may include a performance specification that defines a targeted amount of time within which processing on each path should complete. The targeted amount of time can be defined for all paths and/or different amounts of time could be defined for different groups of related paths.

Figure 2:
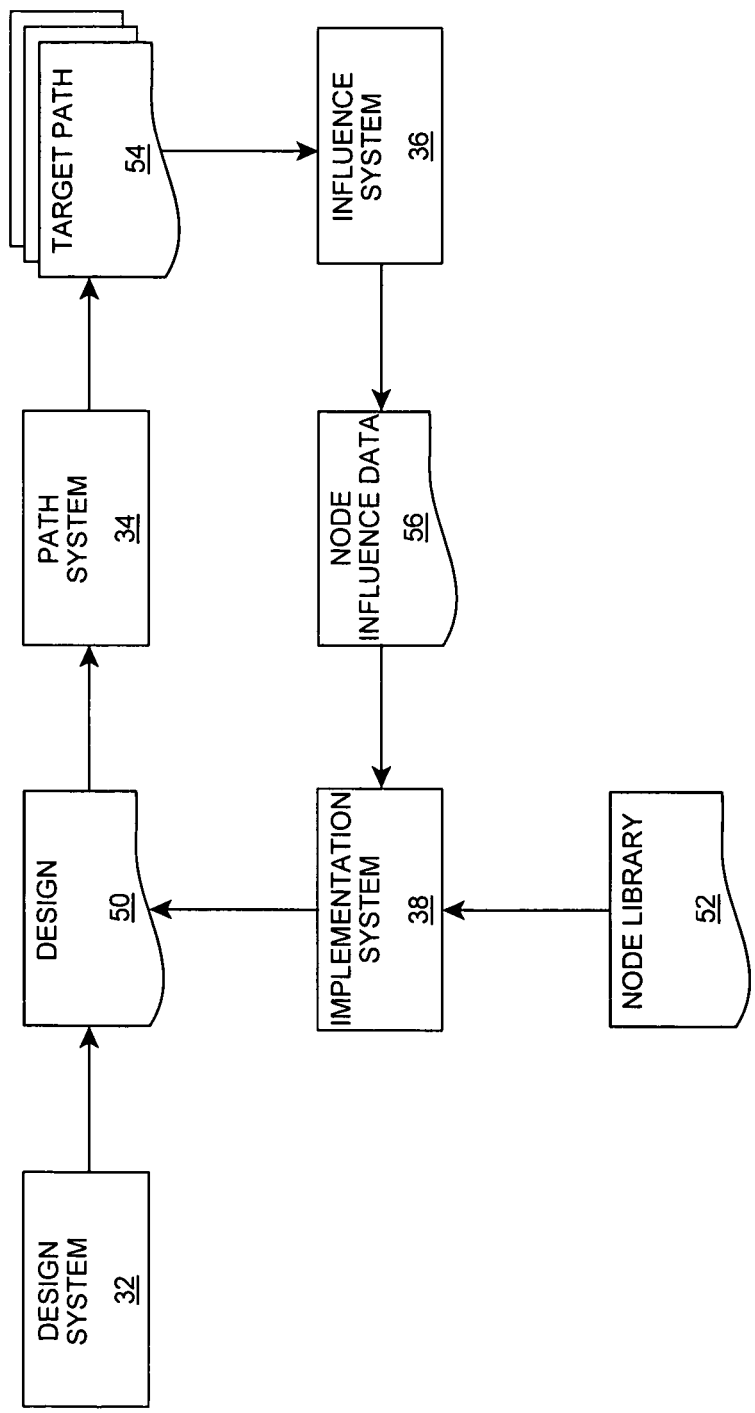
FIG. 2 shows an illustrative data flow diagram for the various systems of FIG. 1 according to an embodiment of the invention.
Figure 3B:
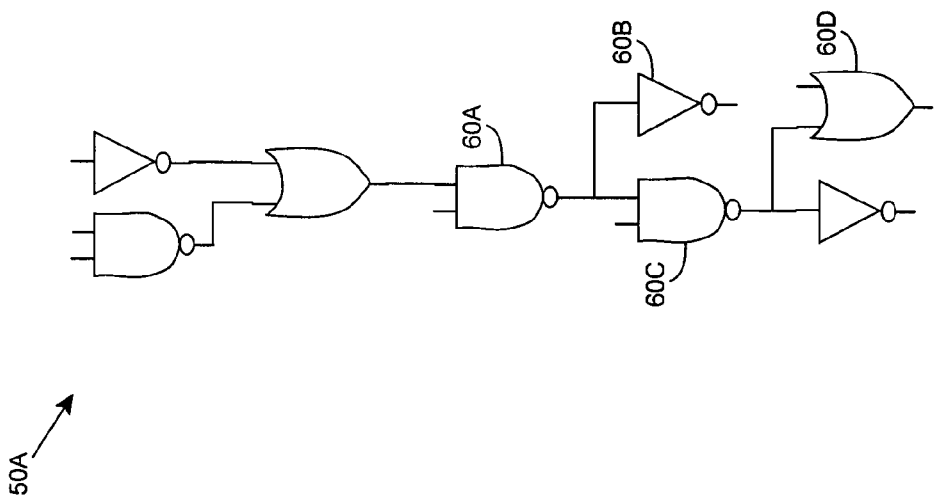

FIG. 2 shows an illustrative data flow diagram for the various systems of FIG. 1 according to an embodiment of the invention. As shown in FIG. 2, design system 32 can provide design 50 for processing by path system 34. Each path in design 50 whose performance attribute (e.g., processing time) exceeds the performance specification can be targeted for improvement. To this extent, path system 34 can obtain a set of target paths 54 in design 50, each of which is targeted for improvement. For example, path system 34 could provide design 50 and/or the performance attribute for improvement to another system, which can provide path system 34 with the set of target paths 54. Alternatively, path system 34 can analyze design 50 and generate the set of target paths 54. In the latter case, path system 34 initially can identify all paths in design 50, quantify the performance attribute for each path, and add each path whose performance attribute is outside of the performance specification (e.g., processing time exceeds a targeted amount of time) to the set of target paths 54. In any event, FIG. 3B shows design 50A with an illustrative set of target paths 54A-C displayed thereon. In design 50A, node 60A is included in all three target paths 54A-C, node 60B is included in only target path 54C, and nodes 60C-D are included in two target paths 54A-B.

Referring to FIGS. 2 and 3B, path system 34 can provide the set of target paths 54A-C for processing by influence system 36. Influence system 36 can obtain node influence data 56 for the set of target paths 54A-C. Node influence data 56 can comprise an influence for one or more of the nodes 60A-D in the set of target paths 54A-C. Influence system 36 could provide some or all of the set of target paths 54A-C to another system, which can provide influence system 36 with node influence data 56. Alternatively, influence system 36 can analyze the set of target paths 54A-C and generate node influence data 56. In the latter case, influence system 36 could identify each unique node 60A-D in the set of target paths 54A-C and calculate a corresponding influence based on the number of target paths 54A-C in which the node 60A-D is present.

The influence of a node 60A-D can be calculated in any of various manners. For example, the influence can comprise a total number of target paths 54A-C on which the node 60A-D is present. In this case, node 60A would have an influence of three, node 60B would have an influence of one, and nodes 60C-D each would have an influence of two. Alternatively, the influence can be weighted based on the performance attribute for the corresponding target path(s) 54A-C. For example, target path 54A may require a performance improvement of three arbitrary units. In this case, each node 60A, 60C-D on target path 54A can be assigned the required performance improvement of three arbitrary units. The influence of a node, such as node 60A, can be calculated as a sum of the performance improvements obtained for each node 60A-D on each path 54A-C that goes through node 60A as a result of the performance improvement to node 60A. To this extent, for path 54A, a performance improvement of three arbitrary units to node 60A may result in a performance improvement of three arbitrary units for node 60C. However, the actual performance improvement may be less for one or more nodes. For example, the second input of node 60D, which is not on path 54A and therefore not impacted by a performance improvement made to node 60A, may require an improvement of two arbitrary units. In this case, the performance improvement for node 60D that results from improving node 60A will be one arbitrary unit since node 60D will still require a performance improvement of two arbitrary units. It is understood that node influence data 56 may only include an influence for a subset of nodes 60A-D in the set of target paths 54A-C. For example, the subset of nodes 60A-D can be selected based on a location in a target path 54A-C, a type of circuit element represented by the node 60A-D, and/or the like. Further, it is understood that the influence for one or more nodes 60A-D could be estimated/calculated based on the influence of another node 60A-D (e.g., by implication for nodes further to the end of a path).

Implementation system 38 can make one or more improvements to design 50A using node influence data 56 and node library 52. Node library 52 comprises a set of alternative implementations for the various possible nodes 60A-D in design 50A. Each alternative implementation in node library 52 can provide the same functionality in the circuit as the other alternative implementations, but can have one or more different performance attributes (e.g., delay, leakage, and/or the like). To this extent, node library 52 can include a set of performance attributes for each alternative implementation. Node library 52 can be stored in a computer-readable medium using any solution (e.g., as one or more files in a file system, record(s) in a database, and/or the like).

For example, FIG. 4A shows a portion of an illustrative node library 52A according to an embodiment of the invention. Node library 52A includes various alternative implementations 62A-C for a NAND gate, e.g., node 60A (FIG. 3A). In this case, each implementation 62A-C corresponds to a high threshold voltage implementation 62A, a regular threshold voltage implementation 62B, and a low threshold voltage implementation 62C. Along with each implementation 62A-C, node library 52A includes data on a set of performance attributes, e.g., a delay 64 and a leakage 66. As can be seen, in general, the lower threshold voltage implementations 62B-C comprise lower delays, but have a higher leakage than the higher threshold voltage implementations 62A-B. It is understood that while three alternative implementations 62A-C are shown for illustrative purposes, each type of node (e.g., gate) could have any number of alternative implementations 62A-C.

Referring to FIGS. 2 and 4A, influence system 36 can include a current implementation 62A-C of each node included in node influence data 56. The current implementation 62A-C indicates which of the set of alternative implementations 62A-C for the node in node library 52A is currently designated as being used in design 50. In one embodiment, design system 32 can automatically select a default implementation 62A-C for each type of node in design 50. To this extent, the default implementation 62A-C can be selected based on one of the set of performance attributes, e.g., the implementation 62A-C that provides the most preferable performance attribute. For example, for each NAND gate in design 52A (FIG. 3A), the default implementation could comprise implementation 62A in node library 52A, which provides the lowest leakage 66 (e.g., a high/regular threshold voltage implementation), implementation 62C, which provides the lowest delay 64 (e.g., a low threshold voltage implementation), and/or the like. Further, design system 32 can enable user 16 (FIG. 1) to designate/override the default implementation 62A-C. Alternatively, design 50 may include no information on the particular implementation 62A-C for one or more nodes, and implementation system 38 can use a default implementation 62A-C for each node.

In any event, implementation system 38 can select one or more nodes from node influence data 56 for improvement. In one embodiment, implementation system 38 selects a node from node influence data 56 having the highest influence.

However, implementation system 38 also can use the set of performance attributes for the various alternative implementations 62A-C of each node to select the node(s) for improvement. To this extent, implementation system 38 can identify a set of alternative implementations 62A-C to the current (e.g., default) implementation 62A-C of the node in node library 52A. For each alternative implementation 62A-C, implementation system 38 can obtain a performance metric. Subsequently, implementation system 38 can calculate a sensitivity metric for each alternative implementation 62A-C based on the performance metric and the influence for the node. Implementation system 38 can select the node(s) for improvement based on the sensitivity metric.

The performance metric can quantify a cost-benefit for using the alternative implementation 62A-C instead of the current implementation 62A-C. For example, for two performance attributes, such as leakage 66 and delay 64, the performance metric can quantify a benefit that is obtained in terms of delay 64 (e.g., faster processing) versus the cost in terms of leakage 66 (e.g., higher leakage). In one embodiment, the performance metric can comprise a ratio of the difference in the first performance attribute (e.g., faster processing), for which improvement is desired, over the difference in the second performance attribute (e.g., leakage) between the current implementation and the alternative implementation. In this case, a higher value for the performance metric will indicate a better alternative implementation. To this extent, assuming implementation 62A comprises the current implementation of a NAND gate, the performance metric for the alternative implementation 62B would comprise 1/3.6 (e.g., 5–4/|0.4–4|) and the performance metric for the alternative implementation 62C would comprise 2/99.6 (e.g., 5–3/|0.4–100|).

For the set of alternative implementations 62A-C, node library 52A could store the performance metric in addition to and/or instead of one or more of the performance attributes 64, 66. In this case, implementation system 38 could merely read the performance metric from node library 50A instead of calculating the performance metric. However, the performance metric for some sets of implementations cannot be determined apart from the particular design 50A (FIG. 3A).

For example, FIG. 4B shows a portion of another illustrative node library 52B according to an embodiment of the invention. Node library 52B is shown including a set of alternative implementations 68A-D for a NAND gate, which includes a regular threshold voltage implementation 68A, two hybrid implementations 68B-C, each of which includes some regular threshold voltage and some low threshold voltage transistors, and a low threshold voltage implementation 68D. In this case, each hybrid implementation 68B-C can include a mix of high/regular/low threshold voltage transistors that is selected to improve one or more performance metrics for only a subset of the paths through the gate.

To this extent, the mix can be selected, for example, to provide improved delay on one or more paths through the gate, while keeping a lower leakage on the other paths. In this manner, the delay can be selectively reduced for a critical path. In node library 52B, implementation 68B can comprise low-threshold voltage PFETs and regular-threshold voltage NFETs. As a result, implementation 68B has a lower delay 64A when the output transitions from low to high (e.g., rises) than the delay 64B when the output transitions from high to low (e.g., falls). Conversely, implementation 68C can comprise regular-threshold voltage PFETs and low-threshold voltage NFETs thereby providing a lower delay 64B when the output transitions from high to low than the delay 64A when the output transitions from low to high. It is understood that hybrid implementations 68B-C are only illustrative of various combinations of threshold devices. For example, a hybrid implementation could be configured to provide improved performance for one of the input transitions to the gate. Similarly, a hybrid implementation may be configured to improve delay on different paths through the implementation.

In any event, implementation system 38 (FIG. 1) can calculate/obtain the performance metric for implementations 68B-C based on the corresponding target path 54A-C (FIG. 3B). For example, in FIG. 3B, each target path 54A-C may only require improved timing (e.g., delay) when node 60A transitions from low to high. In this case, the performance metric for implementations 68B-C can be calculated using delay 64A and leakage 66, but not delay 64B, which is not a part of the critical path. For implementations 68A, 68D, both delays 64A-B are the same since these implementations each use all the same threshold voltage transistors. This is not always the case and the individual performance associated with each transition (output rise and output fall from the respective input or inputs) can be used to calculate the performance metric.

Returning to FIG. 2, implementation system 38 can calculate the sensitivity metric for each alternative implementation by combining the performance metric and the influence for the node. For example, implementation system 38 can calculate the sensitivity by multiplying the performance metric by the influence. Using the illustrative performance metric described herein, a higher sensitivity metric will indicate a better alternative implementation. To this extent, implementation system 38 can select the alternative implementation 62A-C (FIG. 4A) having the highest sensitivity metric among all the alternative implementations 62A-C for the node and/or all nodes in node influence data 56. Once selected, implementation system 38 can improve the performance attribute of the node, e.g., node 60A in design 50A of FIG. 3A, by replacing the current implementation of the node, such as implementation 62A, with the selected alternative implementation of the node, such as implementation 62B or 62C (FIG. 4A). Similarly, if given the node library of FIG. 4B, implementation system 38 can select from the alternative implementations 68A-D.

Figure 5:
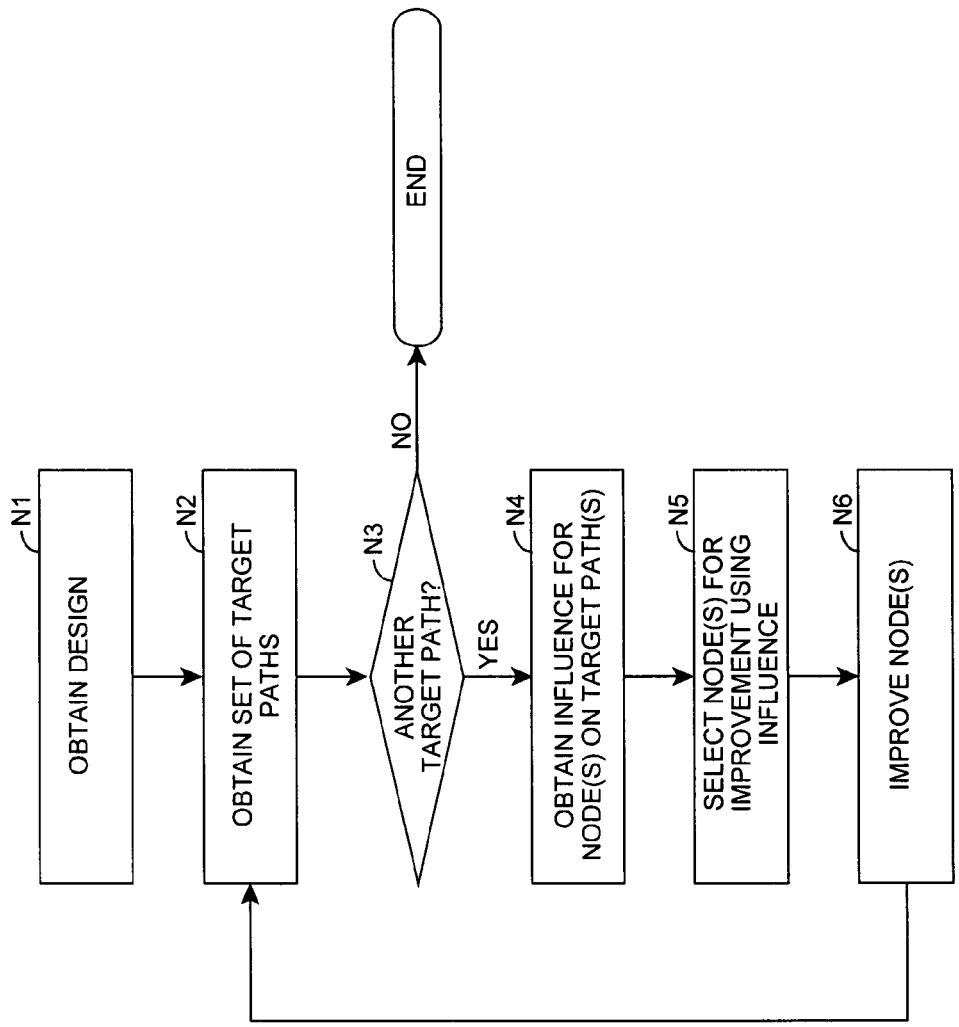
FIG. 5 shows an illustrative process for improving design according to an embodiment of the invention.

Returning to FIG. 1, circuit system 30 can implement any combination of various processes for improving design 50. For example, FIG. 5 shows an illustrative process for improving design 50 according to an embodiment of the invention. Referring to FIGS. 1 and 5, in step N1, design system 32 can obtain a design 50 to be improved. In step N2, path system 34 can obtain a set of target paths in design 50. In step N3, path system 34 can determine if one or more target paths were present in design 50. If not, then design 50 cannot be improved and processing can end. Otherwise, in step N4, influence system 36 can obtain an influence for each node on the target path(s). In step N5, implementation system 38 can select one or more nodes for improvement using the influence. To this extent, implementation system 38 can select the node(s) having the highest influence and/or highest sensitivity metric in the set of nodes. In any event, in step N6, implementation system 38 can improve each of the selected nodes in design 50. The revised design then can be provided to path system 34, and processing can return to step N2. As can be seen, this process can repeat until no more target paths are present in design 50.

FIG. 6 shows another illustrative process for improving design 50 according to an embodiment of the invention. In this case, the process comprises more of a path-based approach to improving design 50. Referring to FIGS. 1 and 6, in step P1, design system 32 can obtain a design 50 to be improved. In step P2, path system 34 can obtain a set of target paths in design 50. To this extent, path system 34 can order the set of target paths based on a criticality of each path. For example, as discussed herein, each path can comprise a performance attribute (e.g., delay) that requires improving. In this case, path system 34 can order the set of target paths so that those paths that require the most improvement (e.g., the most critical paths) are processed first.

In any event, in step P3, path system 34 can determine if another target path in the set of target paths requires processing, and in step P4, path system 34 can determine if another node in the current target path requires processing. If so, then in step P5, influence system 36 can obtain an influence for the current node. Otherwise, in step P6, implementation system 38 can select a node on the current target path for improvement using the influence (e.g., highest influence and/or highest sensitivity metric), and in step P7, implementation system 38 can improve the selected node. Subsequently, flow can return to step P3, in which path system 34 determines whether another target path requires processing. In this manner, the most critical target paths are improved first. After all target paths have been processed, the improved design 50 could be provided to path system 34, which could obtain another set of target paths as in step P2. This process could continue until the set of target paths obtained by path system 34 is empty.

In improving design 50, implementation system 38 may unnecessarily improve one or more nodes. To this extent, circuit system 30 can further implement a process for recovering a portion of a performance attribute (e.g., leakage) that was sacrificed in improving the other performance attribute (e.g., delay). FIG. 7 shows another illustrative process for improving a design 50 according to an embodiment of the invention. Referring to FIGS. 1 and 7, in step D1, design system 32 can obtain a design to be improved. In step D2, the various systems in circuit system 30 can improve design 50 for a first performance attribute (e.g., delay). For example, the improvement could use a node-based process and/or a target path-based process as described herein.

In any event, after design 50 has been improved, in step D3, the various systems in circuit system 30 can improve design 50 for a second performance attribute (e.g., leakage). In this case, the improvement of the leakage is limited by the delay that would result. By performing step D3, the resulting design 50 will have the delay improved as desired while reducing (e.g., minimizing) the adverse impact to the leakage. For example, implementation system 38 can identify each node that was improved in step D2, and determine whether an alternative implementation of the node that has a lower leakage can be used while the delay for each corresponding path of the node remains within a performance specification for the delay. Further, design 50 could comprise default implementations that are of a regular threshold voltage. In this case, implementation system 38 could identify one or more regular implementations that can be replaced with a high threshold voltage implementation, subject to the impact that would occur for the delay. Regardless, implementation system 38 can use the same measurements (e.g., influence, performance metrics, and/or the like) to determine the desired implementation. However, one or more formulas used by implementation system 38 in its determination may be altered. For example, in order to improve leakage while minimally affecting delay, a node having the least influence may be a better candidate for leakage improvement. Alternatively, the influence of a node may not be considered during step D3. It is understood that each of the processes described herein is only illustrative. To this extent, one or more steps may be removed and/or added to the processes described herein. Further, the order of the steps can be altered and/or one or more steps could be implemented in parallel, as will be recognized by one in the art.

In addition to using influence to select one or more nodes in design 50 for improvement, the invention can also consider a change in delay versus a change in leakage provided by an alternative implementation as discussed herein (e.g., the performance metric). To this extent, in an alternative embodiment, the invention provides for improving a circuit by selecting an alternative implementation for one or more nodes in design 50 based on the change in delay versus the change in leakage provided by the alternative implementation, apart from the influence of the node.

As discussed herein, the invention can be implemented with a node library, such as node library 52A of FIG. 4A, which only includes implementations 62A-C having all high/regular/low threshold voltage devices, or with a node library, such as node library 52B of FIG. 4B, which includes implementations 68B-C that include a mix of threshold voltage devices. In the latter case, use of the invention enables design 50 (FIG. 1) to be improved using a transition based solution. That is, when only one of a plurality of transitions is required to be improved (e.g., a rising output), then an implementation 68B-C can be selected that improves the particular transition. In this manner, an overall impact on other performance attributes can be reduced. For example, comparing node libraries 52A-B of FIGS. 4A-B, it may be desirable to improve a falling output delay for a NAND node implemented using regular threshold voltage devices (e.g., implementation 62B for node library 52A or implementation 68A for node library 52B) by one arbitrary unit. With node library 52A, implementation 62C will be selected at a cost of 96 arbitrary units of leakage (e.g., 100–4). However, with node library 52B, implementation 68C can be selected at a cost of 46 arbitrary units of leakage (e.g., 50–4). In this case, the use of node library 52B instead of node library 52A results in a leakage savings of 50 arbitrary units (e.g., 96–46).

While shown and described herein as a method and system for designing a circuit, it is understood that the invention further provides various alternative embodiments. For example, in one embodiment, the invention provides a program product stored on a computer-readable medium, which when executed, enables a computer infrastructure to design a circuit. To this extent, the computer-readable medium includes program code, such as circuit system 30 (FIG. 1), which implements the process described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 22A (FIG. 1) and/or storage system 22B (FIG. 1) (e.g., a fixed disk, a read-only memory, a random access memory, a cache memory, etc.), as a data signal traveling over a network (e.g., during a wired/wireless electronic distribution of the program product), and/or the like.

In another embodiment, the invention provides a method of generating a system for designing a circuit. In this case, a computer infrastructure, such as computer infrastructure 12 (FIG. 1), can be obtained (e.g., created, maintained, having made available to, etc.) and one or more systems for performing the process described herein can be obtained (e.g., created, purchased, used, modified, etc.) and deployed to the computer infrastructure. To this extent, the deployment of each system can comprise one or more of: (1) installing program code on a computing device, such as computing device 14 (FIG. 1), from a computer-readable medium; (2) adding one or more computing devices to the computer infrastructure; and (3) incorporating and/or modifying one or more existing systems of the computer infrastructure, to enable the computer infrastructure to perform the process steps of the invention.

In still another embodiment, the invention provides a business method that performs the process described herein on a subscription, advertising, and/or fee basis. That is, a service provider, such as an application service provider, could offer to design a circuit as described herein. In this case, the service provider can manage (e.g., create, maintain, support, etc.) a computer infrastructure, such as computer infrastructure 12 (FIG. 1), that performs the process described herein for one or more customers. In return, the service provider can receive payment from the customer(s) under a subscription and/or fee agreement and/or the service provider can receive payment from the sale of advertising to one or more third parties.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that the term "system" represents any combination of hardware and/or software capable of performing some function(s).

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method of designing a circuit, the method comprising:
   obtaining a design for the circuit;
   obtaining a set of target paths in the design, each target path comprising a set of nodes and having a first performance attribute that is targeted for improvement;
   obtaining an influence for at least some of the nodes in the set of target paths, wherein the obtaining includes at least one of:
      determining a total number of target paths in the set of target paths on which each of the at least some of the nodes is present; or
      calculating, for each of the at least some of the nodes, a sum of improvements to the first performance attribute obtained for each node targeted for improvement in the set of target paths as a result of an improvement to the first performance attribute for the node;
   selecting at least one of the at least some of the nodes for improvement using the influence;
   improving the first performance attribute of the at least one of the at least some of the nodes in the design; and
   storing the improved design for the circuit.

2. The method of claim 1, further comprising:
obtaining a current implementation of a node in the design;
identifying a set of alternative implementations to the current implementation; and
obtaining a performance metric for each of the alternative implementations based on the first performance attribute and a second performance attribute for the current implementation and each alternative implementation, wherein the performance metric quantifies a cost-benefit for using the alternative implementation instead of the current implementation.

3. The method of claim 2, further comprising calculating a sensitivity metric based on the performance metric and the influence, the selecting being based on the sensitivity metric.

4. The method of claim 2, further comprising, calculating, for at least one of the set of alternative implementations, at least one of the first performance metric and the second performance metric based on the target path.

5. The method of claim 2, the first performance metric comprising one of slack and leakage and the second performance metric comprising the other of slack and leakage.

6. The method of claim 1, the improving including replacing a current implementation of the at least one of the at least some of the nodes with an alternative implementation of the node.

7. The method of claim 1, further comprising improving a second performance attribute for at least one of the nodes in the design such that the first performance attribute of each path on which the node is located remains within a performance specification.

8. A system for designing a circuit, the system including at least one computing device comprising:
a system for obtaining a design for the circuit;
a system for obtaining a set of target paths in the design, each target path comprising a set of nodes and having a first performance attribute that is targeted for improvement;
a system for obtaining an influence for at least some of the nodes in the set of target paths, wherein the system for obtaining includes a system for determining a total number of target paths in the set of target paths on which each of the at least some of the nodes is present;
a system for selecting at least one of the at least some of the nodes for improvement using the influence; and
a system for improving the first performance attribute of the selected at least one of the at least some of the nodes.

9. The system of claim 8, the at least one computing device further comprising:
a system for obtaining a current implementation of a node in the design;
a system for identifying a set of alternative implementations to the current implementation; and
a system for obtaining a performance metric for each of the alternative implementations based on the first performance attribute and a second performance attribute for the current implementation and each alternative implementation.

10. The system of claim 9, the at least one computing device further comprising a system for calculating a sensitivity metric based on the performance metric and the influence.

11. The system of claim 9, the at least one computing device further comprising a system for calculating, for at least one of the set of alternative implementations, at least one of the first performance metric and the second performance metric based on the target path.

12. The system of claim 8, the system for improving including a system for replacing a current implementation of the at least one of the at least some of the nodes with an alternative implementation of the node.

13. The system of claim 8, the at least one computing device further comprising a system for improving a second performance attribute for at least one of the nodes in the design such that the first performance attribute of each path on which the node is located remains within a performance specification.

14. A program product stored on a physical computer-readable medium, which when executed, enables a computer infrastructure to design a circuit, the program product comprising computer program code for enabling the computer infrastructure to:
obtain a design for the circuit;
obtain a set of target paths in the design, each target path comprising a set of nodes and having a first performance attribute that is targeted for improvement;
obtain an influence for at least some of the nodes in the set of target paths, wherein the obtaining includes calculating, for each of the at least some of the nodes, a sum of improvements to the first performance attribute obtained for each node targeted for improvement in the set of target paths as a result of an improvement to the first performance attribute for the node;
select at least one of the at least some of the nodes for improvement using the influence; and
improve the first performance attribute of the at least one of the at least some of the nodes store the improved design for the circuit.

15. The program product of claim 14, further comprising computer program code for enabling the computer infrastructure to:
obtain a current implementation of a node in the design;
identify a set of alternative implementations to the current implementation; and
obtain a performance metric for each of the alternative implementations based on the first performance attribute and a second performance attribute for the current implementation and each alternative implementation.

16. The program product of claim 15, further comprising computer program code for enabling the computer infrastructure to calculate a sensitivity metric based on the performance metric and the influence, the selecting being based on the sensitivity metric.

17. The program product of claim 15, further comprising computer program code for enabling the computer infrastructure to calculate, for at least one of the set of alternative implementations, at least one of the first performance metric and the second performance metric based on the target path.

18. The program product of claim 14, the computer program code for enabling the computer infrastructure to improve including computer program code for enabling the computer infrastructure to replace a current implementation of the at least one of the at least some of the nodes with an alternative implementation of the node.

19. The program product of claim 14, further comprising computer program code for enabling the computer infrastructure to improve a second performance attribute for at least one of the nodes in the design such that the first performance attribute of each path on which the node is located remains within a performance specification.

20. A method of generating a system for designing a circuit, the method comprising:
providing a computer infrastructure operable to:
obtain a design for the circuit;

obtain a set of target paths in the design, each target path comprising a set of nodes and having a first performance attribute that is targeted for improvement;

obtain an influence for at least some of the nodes in the set of target paths, wherein the obtain mci includes at least one of:

determining a total number of target paths in the set of target paths on which each of the at least some of the nodes is present; or calculating, for each of the at least some of the nodes, a sum of improvements to the first performance attribute obtained for each node targeted for improvement in the set of target paths as a result of an improvement to the first performance attribute for the node;

select at least one of the at least some of the nodes for improvement using the influence; and improve the first performance attribute of the at least one of the at least some of the nodes store the improved design for the circuit.

* * * * *